Aug. 6, 1968 R. S. J. GOOD 3,396,320
APPARATUS FOR MEASURING THE MOVEMENT OF A CYCLIC WAVE PATTERN
WITH RESPECT TO A REFERENCE STRUCTURE AND FOR
CONTROLLING THAT MOVEMENT
Filed Nov. 20, 1964 2 Sheets-Sheet 1
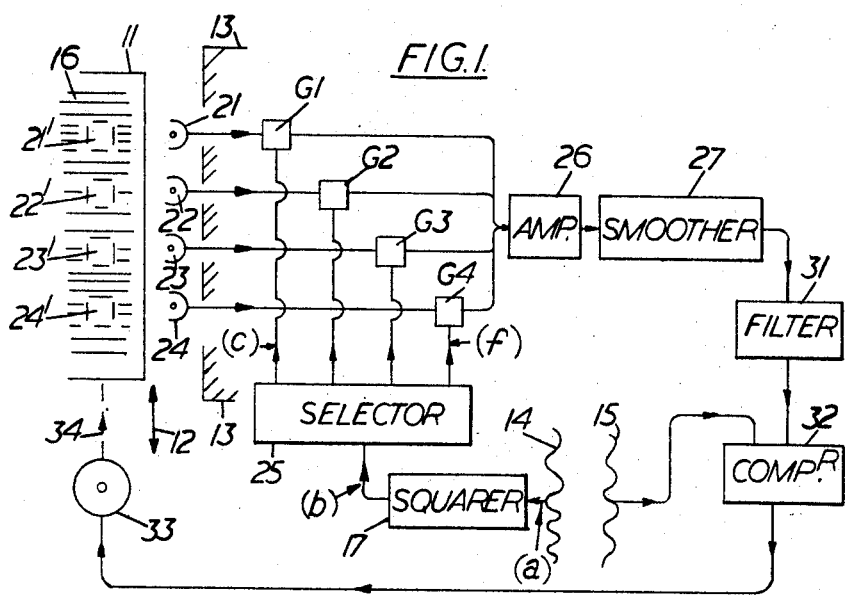
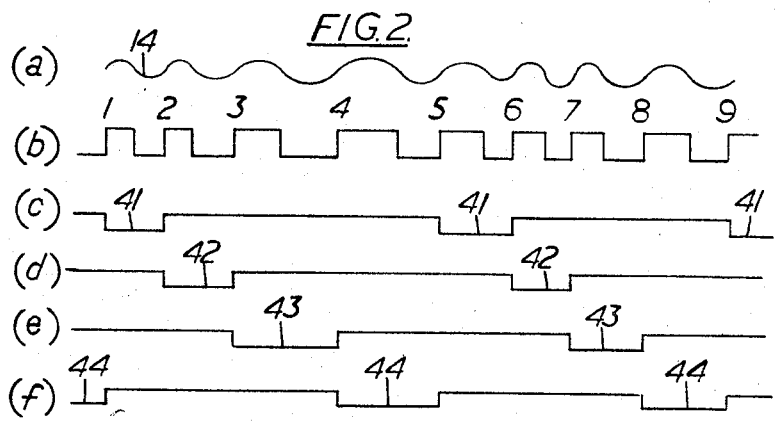
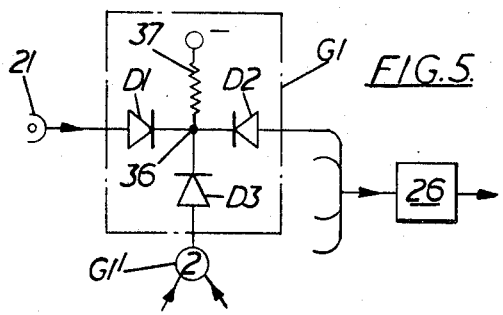
Inventor
R. S. J. GOOD
By
Cameron, Kerkam & Sutton
Attorneys

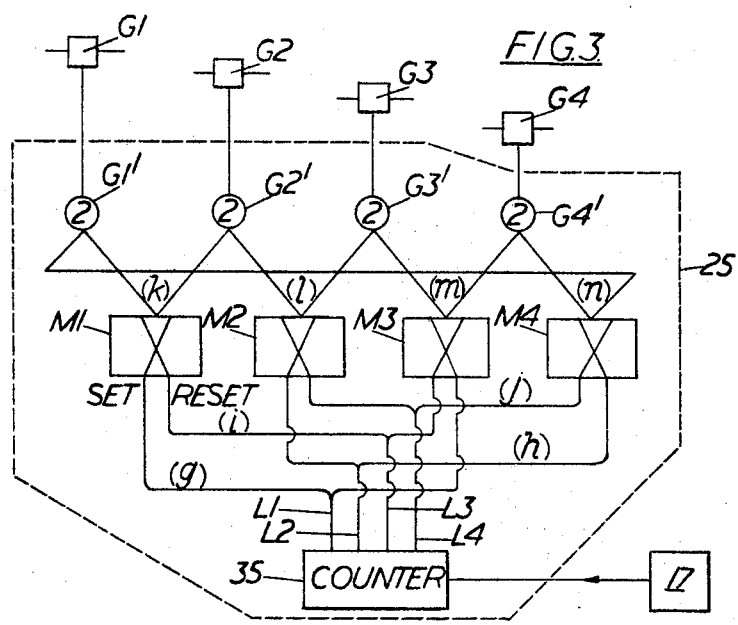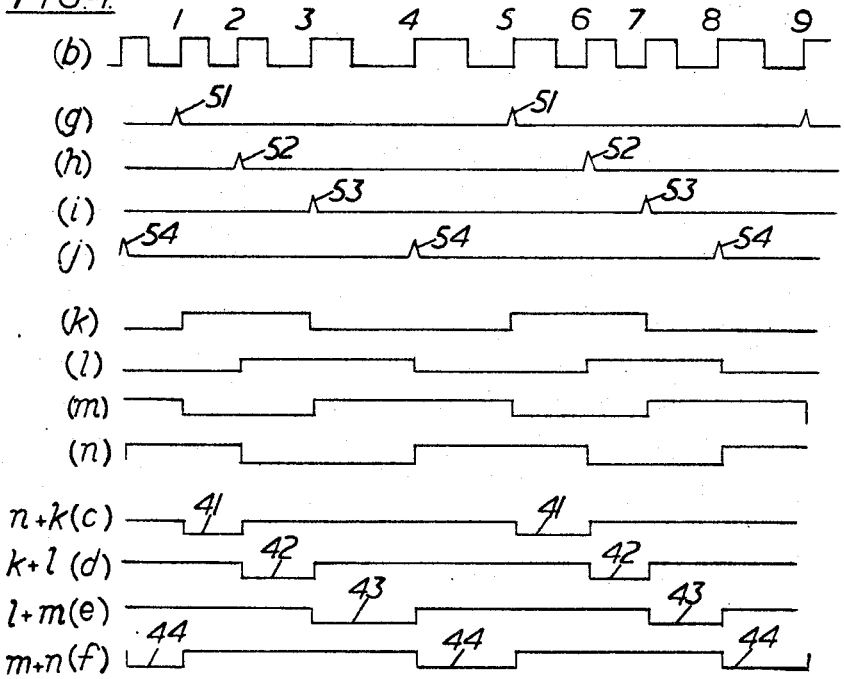

United States Patent Office 3,396,320
Patented Aug. 6, 1968

3,396,320
APPARATUS FOR MEASURING THE MOVEMENT OF A CYCLIC WAVE PATTERN WITH RESPECT TO A REFERENCE STRUCTURE AND FOR CONTROLLING THAT MOVEMENT
Richard Samuel Jonathan Good, Edinburgh, Scotland, assignor to Ferranti, Limited, Hollinwood, England, a company of Great Britain and Northern Ireland
Filed Nov. 20, 1964, Ser. No. 412,708
Claims priority, application Great Britain, Nov. 23, 1963, 46,335/63
4 Claims. (Cl. 318—18)

ABSTRACT OF THE DISCLOSURE

Closed-loop servo apparatus for controlling the movement of a cyclic pattern carried by a machine tool or other movable object in dependence on the phase difference between a cyclic command signal and a cyclic measurement signal obtained by sampling in turn and combining the outputs from detectors responsive to the pattern movement, the duration of each sample being dependent on the wavelength of the contemporaneous cycle of the command signal.

This invention relates to measuring apparatus for measuring and controlling the movement of a cyclic wave pattern of approximately sinusoidal waveform with respect to a reference structure in dependence on the phase of a command sinusoidal signal with respect to a reference signal by means of the combined electrical responses of two or more detectors mounted on the reference structure so as to respond to different phase conditions of the pattern.

The pattern may itself be arranged to move in proportion to the movement of some object, such as part of a machine tool, so that by controlling the pattern movement that of the object may be controlled also.

An object of the invention is to provide such apparatus which includes simple but effective arrangements for so combining the responses from the detectors as to provide a composite signal suitable for comparing with the reference signal in order to exercise the control required.

In accordance with the present invention, apparatus for measuring and controlling the movement of a cyclic wave pattern of approximately sinusoidal waveform with respect to a reference structure in dependence on the phase of a command sinusoidal signal with respect to a reference signal includes at least two detectors mounted on the reference structure so as to respond to different phase conditions of the pattern, sampling means for producing a composite signal by sampling the electrical outputs of the detectors in turn repetitively in such synchronism with successive cycles of the command signal that the duration of each sample is proportional to the length of a cycle of the command signal individual to that sample, arrangements for smoothing the composite signal to produce an approximately sinusoidal signal phase-modulated differentially in accordance with the movement of the pattern and the modulation of the command signal, a phase comparator for producing an error signal dependent on the phase of the smoothed composite signal with respect to the reference signal, and means for controlling said movement in dependence on the error signal in the sense for nulling the error signal.

In the accompanying drawings,
FIGURE 1 is a schematic diagram of one embodiment of the invention,
FIGURE 2 is a set of waveforms to illustrate the operation of the apparatus of FIGURE 1,
FIGURES 3 and 5 are schematic diagrams of stages shown generally in FIGURE 1, and
FIGURE 4 is a set of waveforms to illustrate the operation of the apparatus of FIGURE 3.

The invention will be described by way of example as applied to control the movement of a work-table 11—see FIG. 1—of a machine tool in one or other of opposite directions, indicated by the arrows 12, with respect to a supporting structure in the shape of the framework 13 of the tool in obedience to the phase of a command sinusoidal signal 14 with respect to a reference sinusoidal signal 15. Each of these signals is conveniently in electrical form and therefore varying with time, the reference signal having a constant frequency equal to the mean frequency of the command signal.

In carrying out the invention in accordance with this form, a cyclic optical pattern 16 is secured so as to move with the table 11 whilst extending sinusoidally in the directions 12 of that movement. Secured to the frame 13 are four detectors in the shape of photocells 21 to 24 so located as to respond to conditions of the pattern at positions $21^1$ to $24^1$, respectively, which are regularly spaced 90 degrees apart, excluding any integral number of whole wavelengths in between positions.

To produce a composite signal by sampling the electrical outputs of the cells repetitively in synchronism with the command signal 14, the command signal is applied by way of a squarer stage 17 to a selector 25 controlling four transmission gates G1 to G4, associated with the four cells, in a manner to be described. The cell outputs are applied through the respective gates—that is, cell 21 through gate G1, cell 22 through gate G2, and so on—to the common input of an amplifier 26 the output from which is applied by way of a smoothing stage 27 and a filter stage 31 to one of the two inputs of a phase comparator 32. The other input to the comparator is supplied by the reference signal 15; the output is applied to drive a reversible servo motor 33 (which may take the form of a hydraulic actuator or hydraulic motor electrically controlled) the mechanical output of which is applied as indicated by the broken line 34 to adjust the position of the worktable 11.

The operation of this apparatus will be described with reference to the electrical signal waveforms of FIG. 2. Here waveform (a) shows the command signal, varying in phase, or perhaps more conveniently thought of as varying in wavelength, with respect to the reference signal. As the latter is merely of regular sinusoidal form of constant phase (or wavelength) and of frequency equal to the mean frequency of the command signal it is omitted from the drawing of FIG. 2 for clarity.

In stage 17 the command signal is squared, to produce the waveform (b).

Selector 25 is arranged to respond to waveform (b) by generating for each of gates G in turn, repetitively, a negative-going square pulse in synchronism with a cycle of the command signal individual to that gate and of width equal to the length of that cycle. Thus, for example, the selector derives from the command signal for gate G1 a negative-going pulse 41 (see waveform (c)) in synchronism with the first cycle of waveform (a), another pulse 41 in synchronism with the fifth cycle, another from the ninth cycle, and so on. Each pulse 41 has a width equal to the length of the command cycle from which that pulse is derived and holds gate G1 open, thereby connecting cell 21 to amplifier 26, for the duration of the pulse.

For gate G2, the selector derives a pulse 42 (waveform (d)) from each second, sixth, tenth, etc., cycle of the command signal, and so opens the gate to cause cell 22 to be connected to the amplifier for the duration of each of those pulses.

Similarly for gates G3 and G4, the pulses being indicated at 43 and 44 in waveforms (e) and (f) respectively.

By this arrangement the output signals from the photocells are sampled in turn, repetitively, and there is produced at the input to amplifier 26 a composite signal in such synchronism with successive cycles of the command signal 14 that the duration of each sample is equal to the length of a cycle of the command signal individual to that sample.

In stage 27 the composite signal is smoothed and in stage 31 it is filtered by a circuit tuned sharply to the frequency of the reference signal 15 to exclude noise and compensate for imperfections in the switching action exercised by the selector on the gates.

In stage 32 the smoothed and filtered composite signal is compared with the reference signal 15 and any departure of their phase relationship from a predetermined value results in the derivation of an error signal of appropriate sense which is applied by way of servo motor 33 to adjust the worktable to the position required by the command signal, thereby nulling the error signal.

The composite signal is thus a carrier signal at the mean frequency of the command signal which varies in phase in accordance with the command signal and is further modulated in phase by the movement of the pattern as measured by the photocells. The sense in which the cell outputs are switched cyclically through a amplifier 26 by the selector is arranged to be such that the resultant of these two modulations is the difference between them. When therefore the worktable is in the position required by the command signal this difference is zero, and the composite signal is of a constant frequency which is the same as that of the reference signal and is of a phase compared with that of the reference signal such that no error signal is developed. As soon as a discrepancy becomes apparent between the actual and demanded positions of the table, the composite signal develops a phase shift which in turn causes an error signal of the corrective sense to be applied to the servo motor as described above.

Selector 25 may conveniently take the form of a scale-of-four counter 35—see FIG. 3—driven from squarer stage 17 and having four output leads L1 to L4 which represent the four digit positions. The counter is triggered in synchronism with successive positive-going edges of waveform (b) of the command signal and hence once for each cycle of that signal.

The four output leads are thereby pulse-energised in turn cyclically. Each lead is energised by a pulse at every fourth such edge—for example, lead L1 at the first, fifth, ninth, etc., edges of waveform (b), lead L2 at the second, sixth, tenth, etc., edges, and so on, cyclically. These pulses are applied to trigger four bistable stages M1 to M4 so that each pulse on lead L1 switches stage M1 to its set condition but stage M3 to its reset condition; each pulse on lead L2 similarly sets stage M2 but resets stage M4; each pulse on lead L3 sets stage M3 but resets stage M1; and each pulse on lead L4 sets stage M4 but resets stage M2.

Associated with the bistable stages are four two-entry And gates $G1^1$ to $G4^1$ the outputs of which are applied to control the transmission gates G1 to G4 respectively. The inputs to gate $G1^1$ are derived from stages M4 and M1 so that the gate passes a signal to open gate G1 when both those stages are in their set condition. Gate $G2^1$ is similarly controlled by stages M1 and M2, gate $G3^1$ by stages M2 and M3, and gate $G4^1$ by stages M3 and M4.

The operation of this selector will be described with reference to the waveforms of FIG. 4, the first of which is a reproduction of waveform (b) of FIG. 2 with the cycle preceding the first cycle of that waveform added in broken lines.

Waveform (g) shows the pulses 51 applied over lead L1 at every fourth positive-going edge of waveform (b); similarly waveforms (h) to (i) show the pulses 52 to 54 applied over leads L2 to L4 respectively at the other positive-going edges of waveform (b). The first pulse 54 shown is generated by the leading edge of the cycle of waveform (b) shown in broken lines.

Waveform (k) shows the output from stage M1, set by each pulse 51 and reset by each next pulse 53, waveform (l) shows the output from stage M2, set by each pulse 52 and reset by each next pulse 54; and so on for waveforms (m) and (n).

The remaining waveforms reproduce waveforms (c) to (f) of FIG. 2. Thus each pulse 41 of waveform (c) represents the output from gate $G1^1$ when stages M4 and M1 are in their set condition, as indicated by waveforms (k) and (n); each pulse 42 shows the output from gate $G2^1$ when stages M1 and M2 are set, and so on.

Various alternative forms of selector 25 may be used if preferred. For example, as only four transmission gates are to be controlled, the outputs from two bistable stages, rather than four, may provide a sufficient range of combinations if applied to the transfer gates by suitable logic stages. Or, if more convenient, the And gates $G1^1$, etc., may all be omitted, each stage M controlling one of the transmission gates and being reset by the next pulse from the counter rather than by the next but one.

The pulses 41 to 44 for opening gates G1 to G4 are made negative-going to suit the kind of transmission gate found most convenient. Such a gate is shown in FIG. 5, taking gate G1 as an example. Photocell 21 is connected to the common input to amplifier 26 by oppositely-poled diodes D1 and D2 in series with their cathodes or equivalent electrodes joined to a common point 36 which is connected by a resistor 37 to a source of negative potential. The output from gate $G1^1$ is connected to point 36 by way of another diode D3 poled so that its cathode is connected to that point.

The arrangement is such that when a pulse 41 is absent, the output from gate $G1^1$ represented by waveform (c) is sufficiently positive for diode D3 to conduct, drawing current through resistor 37 and so holding point 36 at a fixed potential; thus any voltage variations from the photocell are unable to reach the amplifier. At each pulse 41 the signal from gate $G1^1$ goes sufficiently negative to remove this voltage clamp and so allows the photocell signals to reach the amplifier so long as that pulse is present. Diode D2 is provided to prevent unwanted interaction with the other input circuits to the amplifier.

The invention is also applicable where instead of four detectors there are three detectors responsive to conditions uniformly spaced along the pattern. The arrangement may be closely similar to that described above except that each detector output is sampled at every third cycle of the command signal. Counter 35 would thus need to operate to a scale of three, there being only three gates to control.

Where the detectors respond to conditions that are not uniformly spaced along the pattern, a regularizing stage of the kind described in my now-abandoned co-pending U.S. patent application No. 311,057 may be introduced between the detectors and the transfer gates.

The invention is also applicable where the cyclic wave pattern is other than an optical one. It might for example be a recorded magnetic pattern, the detectors being then in the form of electromagnetic pickups of the kind capable of responding to a condition of the pattern even when the pattern is stationary.

What I claim is:

1. Apparatus for measuring and controlling the movement of a cyclic wave pattern of approximately sinusoidal waveform with respect to a reference structure in dependence on the phase of a command sinusoidal signal with respect to a reference signal, including at least two detectors mounted on the reference structure so as to respond to different phase conditions of the pattern, sampling means for producing a composite signal by sampling the electrical outputs of the detectors in turn repetitively in such synchronism with successive cycles of the command signal that the duration of each sample is proportional to the length of a cycle of the command signal individual to that sample, means for smoothing the composite signal to produce an approximately sinusoidal signal phase-modulated differentially in accordance with the movement of the pattern and the modulation of the command signal, a phase comparator for producing an error signal dependent on the phase of the smoothed composite signal with respect to the reference signal, and means for controlling said movement of the pattern in dependence on the error signal in the sense for nulling the error signal.

2. Apparatus as claimed in claim 1 wherein the output circuit for each detector includes a transmission gating stage so controlled by the sampling means as to be held open for the duration of each cycle of the command signal which is individual to that detector.

3. Apparatus as claimed in claim 2 wherein the sampling means includes a scale-of-X counter, where X is the number of detectors, triggerable once for each cycle of the command signal, and X bistable stages switchable by the outputs from the respective digit positions of the counter, the outputs from the bistable stages being applied to control the gating stages.

4. Apparatus for measuring and controlling the movement of a cyclic wave pattern of approximately sinusoidal waveform with respect to a reference structure in dependence of the phase of a command sinusoidal signal with respect to a reference signal, including at least two detectors so mounted on the reference structure as to respond to different phase conditions of the pattern, sampling means for producing a composite signal by sampling the electrical outputs of the detectors in turn repetitively in such synchronism with successive cycles of the command signal that the duration of each sample is proportional to the length of a cycle of the command signal individual to that sample, means for smoothing the composite signal to produce an approximately sinusoidal signal phase-modulated differentially in accordance with the movement of the pattern and the modulation of the command signal, and a phase comparator for producing an error signal dependent on the phase of the smoothed composite signal with respect to the reference signal.

References Cited

UNITED STATES PATENTS

| 3,122,686 | 2/1964 | Davies et al. | 318—18 |
| 3,320,501 | 5/1967 | Davies | 318—29 XR |

BENJAMIN DOBECK, *Primary Examiner.*